ent Office 3,100,715
Patented Aug. 13, 1963

3,100,715
PATCHING PLASTER COMPOSITIONS
Richard J. Leonard, 400 51st St., Des Moines 12, Iowa
No Drawing. Filed Nov. 12, 1958, Ser. No. 773,187
11 Claims. (Cl. 106—110)

This invention is a counter conventional use of expanded perlite fines with calcined gypsum to make a patching plaster compound that tends to expand, as it dries, rather than to contract, as is usual for plaster patching compounds. This application is a continuation-in-part of application Serial No. 516,025, filed June 16, 1955, now abandoned. A modification of the basic invention includes a clay plasticizer; amateurs find it easy to use. In general the mix also contains a quantity of retarder which may be any of numerous materials conventionally used for the purpose of slowing down the drying or setting time of the plaster. The compound also responds conventionally to known accelerators.

Compounds for patching commonly known and used heretofore comprising mixtures of calcined gypsum, sand, fibers, glues and resins, are generally rather satisfactory as far as mixing and application are concerned. They are all deficient in their set or hardened state properties, however, in that they shrink sooner or later to cause a depression in the wall, cracks on the patch surface, or a loosening of the patch in the repaired crack or hole. To minimize the difficulties resulting from drying shrinkage when using conventional patching compounds, therefore, it is advisable to fill any very substantial hole or crack layer by layer and allowing drying in between layers. Furthermore, as the exact amount of shrinkage that will occur cannot be predicted with exactness, holes are over filled and dressed, by sanding or scraping, down to the wall surface. By exercising such caution, one can minimize but not eradicate the shrinkage problem when using conventional patching compounds. My invention provides a patching plaster mix that avoids shrinking and the evils attendant upon it even when a relatively large patch is made with a single application. If the user is skillful enough to make a good smooth patch that blends with the surface of the repaired wall nicely, dressing as is usually required may be very slight or perhaps dispensed with altogether.

As though this highly desirable non-shrinking feature were not enough, my invention also puts to good use what was formerly a very troublesome waste material resulting from the production of expanded perlite for general use as a plaster aggregate. Because difficulties were encountered when perlite was used as an aggregate generally if there were too many small particles included, the American Standards Association requires perlite aggregate to be of a relatively large particle size. The expanded minerals industry has supported this requirement vigorously, and as a consequence the fines that inevitably result from the production of expanded perlite are a problem to the producer when the expanded perlite is screened to meet ASA specification, ASTM C35–57T. This specification requires the particle distribution shown in the following table.

TABLE I

Perlite Plaster Aggregate, ASTM Specification

| Sieve size | Percentage retained on each sieve by volume | |
|---|---|---|
|  | Maximum | Minimum |
| No. 4 | 0 |  |
| No. 8 | 5 | 0 |
| No. 14 | 60 | 10 |
| No. 50 | 98 | 75 |
| No. 100 | 100 | 88 |

It is customary to measure perlite aggregate by volume rather than weight. Hence the sieve size specification is on this basis. The percentage figures, therefore, means the percentage of bulk that will stand on the screen size for which the percentage is given. In other words as much as 100% but in no event less than 88% of the material should be too large to pass through a 100 mesh screen. Likewise as much as 98% but no less than 75% may be too large to pass a 50 mesh screen. When perlite is expanded on a commercial basis, however, there is a greater percentage of these small particles than the allowable percentages of the particular size permitted by the specification of the ASA. As the presence of fines in excess of the amount allowed by the ASA specification will cause difficulties, plastering inspectors are meticulous in checking perlite aggregates and rejecting that having excess fines. These formerly troublesome fines are the perlite that I find can be used to advantage in the patching compound that is my invention.

Accordingly, it is the main object of this invention to provide a novel plaster patching compound or mix; one that:
 (1) Will not shrink as it dries.
 (2) Provides a good use for fines resulting from the commercial production of expanded perlite.
 (3) Speeds finishing and patching of walls.
 (4) Is light weight.
 (5) Is easy to use.

While the foregoing specifically related objects are the main ones of my invention, it is my intention to include as objects any such as may become clear to anyone who reads the following specification in which I disclose the preferred and alternate practical embodiments of the invention.

I have discovered that what is a serious drawback to perlite aggregate of small particle size for general plastering use makes a patching plaster mix that achieves the objects set out above. Basically my non-shrinking patching plaster mix is commercial gypsum mixed with perlite fines aggregate in the proportion of from 1.5 to 4.0 cu. ft. of perlite for each 100 lbs. of gypsum. Gypsum as used herein is the same material also known as plaster of Paris, commercial unfibered stucco, or $Ca(SO_4)\frac{1}{2}(H_2O)$ to give its chemical designation. The perlite aggregate required for the invention may be defined by means of the screen analysis given in the following table.

TABLE II

*Specification for Perlite Fines for Expanding Type Patching Plaster*

| Sieve size | Percentage retained on each sieve by volume ||
|---|---|---|
| | Maximum | Minimum |
| No. 16 | 0 | 0 |
| No. 30 | 8 | 0 |
| No. 50 | 30 | 10 |
| No. 100 | 60 | 20 |

As a practical matter commercially graded standard expanded perlite that meets the ASTM specification listed in Table I, will have a particle size somewhat larger than the average required by the specification. In Table III below are shown some screen analyses for three different samples taken from perlite aggregate offered for sale as meeting the ASTM specification.

TABLE III

*Samples of Commercially Graded Standard Perlite Plaster Aggregate*

| Sieve size | Percentage retained on each sieve by volume |||
|---|---|---|---|
| | Sample A | Sample B | Sample C |
| No. 16 | 21 | 27 | 20 |
| No. 30 | 65 | 67 | 68 |
| No. 50 | 89 | 88 | 91 |
| No. 100 | 96 | 96 | 97 |

Less than 4% of the perlite listed in Table III is small enough in particle size to pass through the No. 100 sieve.

While the material defined in Table II is actually the rejected fines from usual commercial production of expanded perlite, this source of supply is not always adequate to supply the demand for my patching mix. While the production of some fines cannot be avoided, they can be produced intentionally by grinding the ore before expanding. Table IV shows samples of fines produced for use in my mix.

TABLE IV

*Production Runs of Perlite Fines for Expanding Type Patching Plaster*

| Sieve size | Percentage retained on each sieve by volume |||
|---|---|---|---|
| | Sample A | Sample B | Sample C |
| No. 16 | 0 | 0 | 0 |
| No. 30 | 0 | 0 | 0 |
| No. 50 | 11 | 17 | 13 |
| No. 100 | 21 | 24 | 21 |

Approximately 75% of the perlite fines listed in Table IV are small enough in particle size to pass through the No. 100 sieve and in sharp contrast to the only 4% of Table III.

Thus there is a greater discrepancy in practice than in theory. That is actual average particle size of material used in my mix is smaller than actual ASTM specified aggregate by an amount greater than the specifications for the two would indicate. Essentially, these screen analyses of Table II define the rejects from the usual commercial production of regular commercial grade expanded perlite. A comparison of Tables I and II will quickly show that the average particle size of the fines is much smaller than for the ASTM specification aggregate. In fact the bulk of the ASTM specified perlite has an average particle diameter of approximately 1200 microns, while the bulk of the fines used in my invention has an average particle diameter of approximately 40 microns. As the surface area of a given unit of mass is a function of the square of the diameter, the fines in my aggregate have a surface area approaching one thousand times that of the standard perlite plaster aggregate. This fact plays an important part in the success of my patching plaster mix, as will appear from the following discussion.

I now know that the reason a patching plaster mix constituted as disclosed above does not shrink is, because perlite aggregate gypsum plaster, unless restrained, actually increases gradually in volume after hydration and setting. As will be shown in detail below, the smaller the particle size of the perlite, the greater the growth. This fact about perlite makes small particle size perlite aggregates undesirable for general use, but produces a patching compound that will expand enough to cause a patch made with it to fit tightly into the opening it occupies. The force of the expansion, however, is not sufficient to cause any mechanical problems such as the splitting of walls or ceilings. In some cases where an excess of fines were accidentally included in wall or ceiling plaster, sufficient growth occurred to cause great difficulties. The ASTM specification for perlite aggregate resulted from such experiences, and small size perlite has been generally thought to be worse than useless. That is why I characterize my use of the small size perlite as counter conventional rather than merely unconventional, since I use it in direct contradiction of accepted beliefs about perlite aggregate.

The rate of growth of the set perlite gypsum plaster depends upon the temperature and the relative humidity of the environment of the specimen. Perlite is a naturally occurring mineral; hence, it varies in reactivity from one deposit to another. A typical growth as measured by linear expansion on specimens made with ASTM specification, standard commercial, perlite is in the range of .01% to .03% per year with very little diminution of rate with increase of time. These tests are very time consuming requiring years to carry out. Exact laboratory data for the perlite gypsum mixes using the small particle size are not available, therefore, as it has never been of any great interest before. General chemical theory of solids, however, requires the assumption that the small particle aggregate plaster will have a much greater rate of growth. In solid state chemistry, the extent of the activity between materials is a function of the area of contact between them. For a given mass of any particulated substance, the total surface area increases as the particle size diminishes. Since the gypsum used is the same in standard perlite plasters and in my patching mix, the extent of the reaction in growth resulting will be determined by the particle size of the perlite aggregate. As we have already seen, the perlite required by my invention has nearly one thousand times the amount of surface area as the ASTM specified aggregate. Consequently, the amount of growth in my patching mix using the small size perlite will be substantially greater than that shown by standard perlite plaster. I use this growth tendency resulting from the solid state chemical reactivity of perlite fines combined with gypsum as a means of keeping the set patching plaster tight in a hole or crack, even though the whole wall may experience movement and dimensional changes, as for example, with changes in moisture content.

As a practical matter, a patching or finishing plaster mix will also usually contain a quantity of retarder which serves to delay the setting of the mix after hydration. Any of the materials usually used for this purpose such as those disclosed in United States Patent 2,078,198, issued April 20, 1937, George D. King, inventor, may be used. The amount of retarder used is determined empirically, since different retarders and different gypsums may react with some degree of variation. Sometimes retarder is placed in the gypsum at the gypsum mill. In any event the setting time of the mix may be controlled in well known ways by adding either retarders or accelerators (examples of accelerators are also given in King patent identified above). The amount of these additives used has no appreciable effect on the non-shrinking or growth character of my mix. In understand, however, that perlite aggregate plasters are badly weakened by adding excessive retarders by which I mean enough to retard the setting time to more than three hours. In fact, I recommend that setting time be kept below two hours. A safe maximum figure for this ingredient is 1.8 oz. of retarder per 100 lbs. of gypsum. Gypsum weighs about 42 pounds per cubic foot but this value varies somewhat depending on whether the gypsum is fluffed or packed. Weight is a safer measure of the proper amount of gypsum used. For purposes of comparison, however, 100 pounds of gypsum may be regarded as 2.4 cubic feet. Retarder used in this proportion to gypsum should produce a set time of between 2 and 3 hours, and material sold commercially and found satisfactory has contained as little as 3 drams of retarder per hundred pounds of gysum.

The general composition for my patching plaster mix made with the all fines perlite aggregate is comprised as follows:

|              | Quantity range         |
|--------------|------------------------|
| Perlite fines | 1.5 to 4.0 cu. ft.    |
| Gypsum       | 2.4 cu. ft. (100 lbs.) |

A specific commercially produced and solid mix that is well accepted by users has the following formula:

|              | Quantity range         |
|--------------|------------------------|
| Perlite fines | 3.0 cu. ft.           |
| Gypsum       | 2.4 cu. ft. (100.0 lbs.) |
| Retarder     | 1.6 oz.                |

Another specific formula resulting in a harder patch compound is:

|              | Quantity range         |
|--------------|------------------------|
| Perlite fines | 2.0 cu. ft.           |
| Gypsum       | 2.4 cu. ft. (100.0 lbs.) |
| Retarder     | 1.0 oz.                |

A preferred form of my invention, especially for the "Do-it-yourself" trade, contains added clays as plasticizers. Clay in small quantity adds to the wet stage workability. Clay additions make it possible for inexperienced users to get smooth walls. The increase in plasticity of gypsum and plaster mixes through clay additions has been long known. I have discovered that in my mix as compared to sand gypsum mixes very small additions of clay produce increases in plasticity adequate to take care of even the most inexperienced patching plaster user. The use of clay in ordinary gypsum sand plaster while convenient for the plasterer results in shrinkage cracks in the finished product. In my composition the shrinkage troubles are avoided because, first of all, smaller quantities of clay suffice, and second, the tendency of the perlite fines and gypsum in my mix to grow with increasing age compensates for any decrease in dimensions of the patch as it might dry out an extra amount during abnormally dry weather.

It is always difficult to specify clays for patent purposes because clays are natural products frequently too complex in composition, crystal structure, particle size, particle shape and solubility or dispersibility for specific definition in the manner usual for chemicals. The clay-using industries define clays by using geographical or company names and the phrase "and their equivalents."

I shall discuss a few of the clays that can be added to my basic invention of perlite fines and gypsum. Grarok, which is a natural pozzolanic clay, is a particularly good clay for my invention. It is an effective plasticizer; it has a minimum of shrinkage in my mix, and has a tendency to harden or strengthen the final set product. As far as I know, there are no commercially available equivalents of this particular clay. To further identify Grarok, it is clay taken from a deposit located in the State of Iowa, Section 7, Township 83 North, Range 26 West of the Fifth Principal Meridian, Boone County. The material from this area which when crushed, air dried and ground to eighty (80) screen mesh size is "Grarok" has the following chemical analysis:

|                                                      | Percent |
|------------------------------------------------------|---------|
| Unidentified (volatile at 110° C.)                   | 6.28    |
| Water (below 110° C.)                                | 9.63    |
| Silica                                               | 57.73   |
| Aluminum oxide ($Al_2O_3$)                           | 17.93   |
| Iron oxide, calcium oxide, sulphur trioxide, and traces of cobalt and manganese | 8.43    |

Wyoming bentonite, which is a well-known jellying type bentonite clay, is produced and sold by numerous companies. It is a standard item of commerce. Wyoming bentonite is an exceptionally good plasticizer, however, it is also exceptionally high in shrinkage. The high shrinkage of the clay, however, can be tolerated in the patching plaster because of the small quantity needed to achieve the desired plasticity.

Ball clay is a readily available clay and the particular ball clay I have found useful is C. and C. ball clay. Similar ball clays are available from most of the sellers of ball clay and it can be purchased from them on a specification reading, "C. and C. ball clay, or its equivalent."

Kaolin clay, although very different in its physical action to achieve plasticity, can be used as a plasticizer in my invention. A suitable clay of this type can be specified as "Kaolin S.C., or its equivalent." Most kaolin suppliers can meet this specification.

In my invention, as is so customary in clay-using industries, equivalent clay performance characteristics may be attained by different quantities of various types of clays and from blends of clays. Table V gives examples of patching plaster composition with a distinct degree of plasticity added beyond that naturally possessed by my perlite fines and gypsum composition.

TABLE V

*Patching Plaster Compositions Containing Clays*

| Components | Samples |  |  |  |  |
|---|---|---|---|---|---|
|  | A | B | C | D | E |
| Perlite fines in cu. ft. | 3 | 2 | 2.5 | 3 | 2.5 |
| Gypsum with retarder lbs. | 100 | 100 | 100 | 100 | 100 |
| Grarok | 8 |  |  |  |  |
| Wyoming Bentonite lbs. |  | 0.75 |  |  |  |
| C. and C. ball clay lbs. |  |  | 2 |  | 2 |
| Kaolin S.C. clay lbs. |  |  |  | 6 | 2 |

With clays of low plasticity, the quantity used in the plaster patching compound might go as high as 25% of the weight of the gypsum. This is possible because low plasticity clays are frequently low in shrinkage.

With clays of high plasticity such as Wyoming bentonite the quantity can be reduced to as low as 0.5% of the weight of the gypsum and still make a significant contribution to plasticity.

In my invention the lower limit of the clay is not critical because the perlite fines and gypsum, without clay, have sufficient plasticizer for experienced users. The added clay gives the extra margin of workability needed by the first time "do-it-yourself" user.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

I claim:

1. A patching plaster dry mix consisting essentially in the combination of small particle size expanded perlite and commercial calcined gypsum, said expanded perlite characterized by a particle size range such that 100% by volume passes through a number 30 standard sieve; 70% by volume passes through a number 50 sieve; 40% by volume passes through a number 100 sieve, said commercial gypsum being plaster of Paris with added retarder; the quantity of said expanded perlite is in the range of 2.0 to 4.0 cu. ft. for each 100 lbs. of said gypsum.

2. A patching plaster dry mix consisting essentially in the combination of small particle size expanded perlite, commercial calcined gypsum and clay, said expanded perlite characterized by a particle size range such that 100% by volume shall pass through a number 30 standard sieve; at least 70% by volume shall pass through a number 50 sieve; at least 40% by volume passes through a number 100 sieve, said commercial gypsum being plaster of Paris with added retarder; the quantity of said expanded perlite shall be in the range of 1.5 to 4.0 cu. ft. for each 100 lbs. of said gypsum, and the quantity of said clay shall be in the range of 0.5 to 25 lbs. for each 2.4 cu. ft. (100 lbs.) of said gypsum.

3. The composition of claim 1 in which the volume of said expanded perlite is in the range of 2 to 3 cu. ft. for each 2.4 cu. ft. (100 lbs.) of said gypsum.

4. The composition of claim 1 in which the volume of said expanded perlite is 3.0 cu. ft. for each 100 lbs. of said gypsum.

5. The composition of claim 2 in which the volume of expanded perlite is in the range of 2 to 3 cu. ft. for each 2.4 cu. ft. (100 lbs.) of said gypsum and the clay is Grarok in the amount of about 8 lbs. for each 2.4 cu. ft. (100 lbs.) of gypsum.

6. The composition of claim 2 in which the volume of expanded perlite is in the range of 2 to 3 cu. ft. for each 100 lbs. of said gypsum and the clay is Wyoming bentonite in the amount of 0.5 to 3.0 lbs. for each 100 lbs. of gypsum.

7. The composition of claim 2 in which the volume of expanded perlite is in the range of 2 to 3 cu. ft. for each 100 lbs. of said gypsum and the clay is ball clay in the amount of 2 to 4 lbs. for each 100 lbs. of gypsum.

8. The composition of claim 2 in which the volume of expanded perlite is in the range of 2 to 3 cu. ft. for each 100 lbs. of said gypsum and the clay is kaolin clay in the amount of 4 to 8 lbs. for each 100 lbs. of gypsum.

9. The composition of claim 2 in which the volume of expanded perlite is in the range of 2 to 3 cu. ft. for each 100 lbs. of gypsum and the clay is a mixture of about 2 lbs. of ball clay and about 2 lbs. of kaolin clay for each 100 lbs. of gypsum.

10. In a patching plaster consisting essentially of calcined gypsum, a means for causing said patching plaster to resist shrinking, and means for increasing the wet stage plasticity of said patching plaster, said means for resisting shrinking consisting of expanded perlite small enough in particle size so that on the average 60% by volume passes through a number 100 sieve, and said perlite being present in the amount of about 3 cu. ft. for each 2.4 cu. ft. (100 lbs.) of gypsum, said means for increasing plasticity consisting of Grarock clay added in the amount of about 8 lbs. for each 2.4 cu. ft. (100 lbs.) of gypsum.

11. Patching plaster dry mix consisting essentially of the combination of small particle size expanded perlite and commercial calcined gypsum containing retarder; the proportions of perlite to commercial calcined gypsum being; 2.0 to 4.0 cubic feet of perlite for each 2.4 cubic (100 lbs.) of said commercial calcined gypsum; said perlite characterized by being of a particle size range such that it has an exposed surface area more than 500 times that of the exposed surface area of a similar quantity of expanded perlite meeting the ASTM standard C35–57T.

References Cited in the file of this patent

UNITED STATES PATENTS

| | | |
|---|---|---|
| 499,710 | Bronson | June 20, 1893 |
| 2,078,198 | King | Apr. 20, 1937 |
| 2,501,699 | Stecker | Mar. 28, 1950 |
| 2,648,522 | Armentrout | Aug. 11, 1953 |
| 2,676,892 | McLaughlin | Apr. 27, 1954 |
| 2,921,862 | Sucetti | Jan. 19, 1960 |
| 2,931,733 | Covert et al. | Apr. 5, 1960 |
| 2,980,548 | Hampton | Apr. 18, 1961 |